United States Patent
Sullivan et al.

(10) Patent No.: US 7,703,527 B2
(45) Date of Patent: Apr. 27, 2010

(54) AQUEOUS TWO-PHASE EMULSION GEL SYSTEMS FOR ZONE ISOLATION

(75) Inventors: Philip F. Sullivan, Bellaire, TX (US); Gary John Tustin, Sawston Cambridge (GB); Yenny Christanti, Houston, TX (US); Gregory Kubala, Houston, TX (US); Bruno Drochon, Missouri City, TX (US); Trevor Lloyd Hughes, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 39 days.

(21) Appl. No.: 11/944,681

(22) Filed: Nov. 26, 2007

(65) Prior Publication Data
US 2009/0133868 A1 May 28, 2009

(51) Int. Cl.
*E21B 33/13* (2006.01)
*C09K 8/42* (2006.01)

(52) U.S. Cl. ............. 166/300; 166/292; 166/387; 507/209; 507/266

(58) Field of Classification Search ............... None
See application file for complete search history.

(56) References Cited

U.S. PATENT DOCUMENTS

| | | | |
|---|---|---|---|
| 3,181,611 A | 5/1965 | Dollarhide |
| 3,181,612 A | 5/1965 | West et al. |
| 4,137,970 A | 2/1979 | Laflin et al. |
| 4,425,241 A | 1/1984 | Swanson et al. |
| 4,795,772 A | 1/1989 | Hsieh et al. |
| 5,169,559 A | 12/1992 | Naae et al. |
| 6,169,058 B1 | 1/2001 | Le et al. |
| 6,433,075 B1 | 8/2002 | Davies et al. |
| 6,489,270 B1 | 12/2002 | Vollmer et al. |
| 7,096,954 B2 | 8/2006 | Weng et al. |
| 7,151,078 B2 | 12/2006 | Zaroslov et al. |
| 7,287,588 B2 | 10/2007 | Zaroslov et al. |
| 2004/0072698 A1 | 4/2004 | Zaroslov et al. |
| 2005/0037928 A1* | 2/2005 | Qu et al. ............... 507/100 |
| 2006/0219406 A1 | 10/2006 | Boney et al. |
| 2007/0004496 A1 | 1/2007 | Gordon et al. |

FOREIGN PATENT DOCUMENTS

| | | |
|---|---|---|
| EP | 0 358 385 A2 | 3/1990 |
| EP | 0583814 A1 | 2/1994 |
| GB | 2172008 A | 9/1986 |
| JP | 61225275 | 10/1986 |
| JP | 61225276 | 10/1986 |
| WO | 9207919 A1 | 5/1992 |

OTHER PUBLICATIONS

Capron, I., Costeux, S. and Djabourov, M. Water in Water Emulsions: Phase Separation and Rheology of Biopolymer Solutions. Rheol Acta (2001) pp. 441-456, 40. Copyright Springer-Verlag 2001.
Carlsson, A., Karlstrom, G. and Lindman, B. Thermal Gelation of Nonionic Cellulose Ethers and Ionic Surfactants in Water. Colloids and Surfaces, 47 (1990) pp. 147-165. Copyright Elsevier Science Publishers B.V.

* cited by examiner

*Primary Examiner*—Zakiya W. Bates
(74) *Attorney, Agent, or Firm*—Rachel Greene; David Cate; Robin Nava (57) ABSTRACT

A low viscosity wellbore polymer fluid gelling system comprising an aqueous medium and a water-in-water emulsion comprising a plurality of polymers or oligomers, including at least one removable polymer or oligomer, and at least one gelling polymer or oligomer, wherein said fluid has a low viscosity when injected, and the gelling polymer forms a gel downhole which has a storage modulus of at least about 60 Pa after the removable polymer is removed from the fluid. A method of isolating at least one zone of a subterranean formation penetrated by a wellbore includes the steps of preparing a water-in-water emulsion comprising a plurality of polymers or oligomers including at least one removable polymer or oligomer, and at least one gellable polymer or oligomer; and combining the water-in-water emulsion with an aqueous medium to prepare a low viscosity polymer fluid.

24 Claims, 4 Drawing Sheets

AQUEOUS TWO-PHASE EMULSION GEL SYSTEMS FOR ZONE ISOLATION

BACKGROUND OF THE INVENTION

The statements in this section merely provide background information related to the present disclosure and may not constitute prior art.

This invention relates to fluids used in treating a subterranean formation. In particular, the invention relates to the use of water-in-water emulsions which are low viscosity pumpable liquids on the surface, but which form stiff gels downhole useful for isolation of a zone or zones in subterranean formations.

Various types of fluids are used in operations related to the development and completion of wells that penetrate subterranean formations, and to the production of gaseous and liquid hydrocarbons from natural reservoirs into such wells. These operations include perforating subterranean formations, fracturing subterranean formations, modifying the permeability of subterranean formations, or controlling the production of sand or water from subterranean formations. The fluids employed in these oilfield operations are known as drilling fluids, completion fluids, work-over fluids, packer fluids, fracturing fluids, stimulation fluids, conformance or permeability control fluids, consolidation fluids, and the like. Stimulation operations are generally performed in portions of the wells which have been lined with casings, and typically the purpose of such stimulation is to increase production rates or capacity of hydrocarbons from the formation.

Frequently, multiple desired stimulation locations exist in a formation. Sealing devices, such as packers or plugs are usually employed to permit each location to be separately stimulated. This is desirable so that the stimulation operation for each location may be designed for that location, for example, by designing specific flow rates and pressures into the formation. These devices, as well as the casing and cement in the wellbore, prevent loss of stimulation fluids at the location. However, such devices are bulky, expensive, and can be otherwise undesirable. Further, some portions of the well are not cased and cement lined. Conventional sealing devices are not easily used in such areas of the wellbore, and the sealing devices which exist for such use, tend to be less reliable, i.e., inflatable packers.

While various systems have been attempted to seal zones of the wellbore using chemicals such as foams, or gels, such materials have been difficult at best to place into the wellbore, because of the high viscosity of such materials or handling and mixing requirements. High viscosity materials cannot be easily pumped, and many two-part resin systems involve hazardous chemicals such as isocyanate compounds. Many conventional systems are based on crosslinking chemistry, but these have not been wholly satisfactory in form or delivery.

It would be desirable to have a gel system which is low viscosity and pumpable at the surface, and does not require handling or mixing of hazardous materials. This need is met at least in part by the following invention.

SUMMARY OF THE INVENTION

The current invention relates to fluids used in treating a subterranean formation, and in particular, the invention relates to the use of water-in-water emulsions as pumpable fluids at the surface forming gels downhole useful in isolating zones of subterranean formations. The invention is an improvement over the existing art by providing an pumpable polymer suspension for easy, accurate delivery with minimum equipment and hydration time, where such suspensions are capable of forming stiff gels in desired placements downhole, also called a "gel packer".

In one embodiment of the invention, an ingredient is removed from the water-in-water emulsion to allow the formation of the gel packer.

In one embodiment of the invention, an ingredient of the water-in-water emulsion is degraded to allow the formation of the gel packer.

Some embodiments of the invention incorporate aqueous two-phase fluid systems. Although not limited to any specific theory or mechanism of operation, it is believed that the "water-in-water emulsion" allows the polymer to be dissolved and hydrated in a water phase without making an excessively viscous liquid. This emulsion may be a phase-separated fluid in which two or more water-soluble polymers are dissolved in water to create a low viscosity mixture. Such a pre-hydrated concentrated solution can be rapidly dispersed into another water stream to continuously make polymer solutions for wellbore treatments. This makes possible, in some aspects, the elimination of the disadvantages of dissolving a polymer powder or using an oil phase.

The invention provides a method of isolating a zone or zones of a subterranean formation.

One embodiment of a method of isolating at least one zone of a subterranean formation penetrated by a wellbore includes the steps of preparing a water-in-water emulsion comprising a plurality of polymers or oligomers including at least one removable polymer or oligomer; combining the water-in-water emulsion with an aqueous medium to prepare a low viscosity polymer fluid, introducing the fluid into a zone in the formation, and removing the at least one removable polymer or oligomer, allowing a remaining polymer or polymers to form a gel, isolating said zone from at least one other zone in the formation.

The term "removable polymer or oligomer" as used herein means that the polymer may be removed from the emulsion by any appropriate means, including by any change in the state of the polymer such as change to a solid form, or degradation of the polymer to monomers, or degradation of the fluid polymer to a non-fluid or gas, and other means including reaction with another species to form a compound which will not remain in the emulsion.

DETAILED DESCRIPTION OF THE EMBODIMENTS

At the outset, it should be noted that in the development of any such actual embodiment, numerous implementation— specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

Some embodiments of the invention use a low viscosity, concentrated polymer solution for rapidly making gelled fluids at the wellsite with minimal equipment and horsepower. When two or more different water soluble polymers are dissolved together in an aqueous medium, it is sometimes observed that the system phase separates into distinct regions. For example, this happens when two polymers are chosen that are each water-soluble but thermodynamically incompatible with each other. Such two-phase systems are referred to as "water-in-water emulsions" in some literature, and ATPS (Aqueous Two Phase Systems) in other literature. In the food industry, such fluids are used to create polymer solutions that mimic the properties of fat globules. Although they may be referred to as "emulsions" they do not necessarily contain either oil or surfactant. In the biomedical industry, such systems are exploited as separation media for proteins, enzymes, and other macromolecules that preferentially partition to one polymer phase in the mixture.

Some embodiments of the invention are based upon two-phase polymer-polymer systems achievable with polymers of interest to the oilfield. Also, these two phase mixtures can be used to create low viscosity "Pre-hydrated Concentrated Mixtures" to allow rapid polymer mixing at a well site to achieve a low viscosity polymer fluid. The fluids include at least one removable polymer or oligomer, and at least one gelling polymer or oligomer.

Some examples of gelling polymers useful in the invention include polymers that are either three dimensional or linear, or any combination thereof. Polymers include natural polymers, derivatives of natural polymers, synthetic polymers, biopolymers, and the like, or any mixtures thereof. Some nonlimiting examples of suitable polymers include guar gums, high-molecular weight polysaccharides composed of mannose and galactose sugars, or guar derivatives such as hydropropyl guar (HPG), carboxymethyl guar (CMG), and carboxymethylhydroxypropyl guar (CMHPG). Cellulose derivatives such as hydroxyethylcellulose (HEC) or hydroxypropylcellulose (HPC) and carboxymethylhydroxyethylcellulose (CMHEC) may also be used in either crosslinked form, or without crosslinker in linear form. Xanthan, diutan, and scleroglucan, three biopolymers, have been shown to be useful as well. Synthetic polymers such as, but not limited to, polyacrylamide, polyvinyl alcohol, polyethylene glycol, polypropylene glycol, and polyacrylate polymers, and the like, as well as copolymers thereof, are also useful. Also, associative polymers for which viscosity properties are enhanced by suitable surfactants and hydrophobically modified polymers can be used, such as cases where a charged polymer in the presence of a surfactant having a charge that is opposite to that of the charged polymer, the surfactant being capable of forming an ion-pair association with the polymer resulting in a hydrophobically modified polymer having a plurality of hydrophobic groups.

In some cases, the polymer, or polymers, include a linear, nonionic, hydroxyalkyl galactomannan polymer or a substituted hydroxyalkyl galactomannan polymer. Examples of useful hydroxyalkyl galactomannan polymers include, but are not limited to, hydroxy-$C_1$-$C_4$-alkyl galactomannans, such as hydroxy-$C_1$-$C_4$-alkyl guars. Preferred examples of such hydroxyalkyl guars include hydroxyethyl guar (HE guar), hydroxypropyl guar (HP guar), and hydroxybutyl guar (HB guar), and mixed $C_2$-$C_4$, $C_2$/$C_3$, $C_3$/$C_4$, or $C_2$/$C_4$ hydroxyalkyl guars. Hydroxymethyl groups can also be present in any of these.

As used herein, substituted hydroxyalkyl galactomannan polymers are obtainable as substituted derivatives of the hydroxy-$C_1$-$C_4$-alkyl galactomannans, which include: 1) hydrophobically-modified hydroxyalkyl galactomannans, e.g., $C_1$-$C_{24}$-alkyl-substituted hydroxyalkyl galactomannans, e.g., wherein the amount of alkyl substituent groups is preferably about 2% by weight or less of the hydroxyalkyl galactomannan; and 2) poly(oxyalkylene)-grafted galactomannans (see, e.g., A. Bahamdan & W. H. Daly, in Proc. 8th Polymers for Adv. Technol. Int'l Symp. (Budapest, Hungary, September 2005) (PEG- and/or PPG-grafting is illustrated, although applied therein to carboxymethyl guar, rather than directly to a galactomannan)). Poly(oxyalkylene)-grafts thereof can comprise two or more than two oxyalkylene residues; and the oxyalkylene residues can be $C_1$-$C_4$ oxyalkylenes. Mixed-substitution polymers comprising alkyl substituent groups and poly(oxyalkylene) substituent groups on the hydroxyalkyl galactomannan are also useful herein. In various embodiments of substituted hydroxyalkyl galactomannans, the ratio of alkyl and/or poly(oxyalkylene) substituent groups to mannosyl backbone residues can be about 1:25 or less, i.e. with at least one substituent per hydroxyalkyl galactomannan molecule; the ratio can be: at least or about 1:2000, 1:500, 1:100, or 1:50; or up to or about 1:50, 1:40, 1:35, or 1:30. Combinations of galactomannan polymers according to the present disclosure can also be used.

As used herein, galactomannans comprise a polymannose backbone attached to galactose branches that are present at an average ratio of from 1:1 to 1:5 galactose branches: mannose residues. Preferred galactomannans comprise a 1→4-linked β-D-mannopyranose backbone that is 1→6-linked to α-D-galactopyranose branches. Galactose branches can comprise from 1 to about 5 galactosyl residues; in various embodiments, the average branch length can be from 1 to 2, or from 1 to about 1.5 residues. Preferred branches are monogalactosyl branches. In various embodiments, the ratio of galactose branches to backbone mannose residues can be, approximately, from 1:1 to 1:3, from 1:1.5 to 1:2.5, or from 1:1.5 to 1:2, on average. In various embodiments, the galactomannan can have a linear polymannose backbone. The galactomannan can be natural or synthetic. Natural galactomannans useful herein include plant and microbial (e.g., fungal) galactomannans, among which plant galactomannans are preferred. In various embodiments, legume seed galactomannans can be used, examples of which include, but are not limited to: tara gum (e.g., from *Cesalpinia spinosa* seeds) and guar gum (e.g., from *Cyamopsis tetragonoloba* seeds). In addition, although embodiments of the present invention may be described or exemplified with reference to guar, such as by reference to hydroxy-$C_1$-$C_4$-alkyl guars, such descriptions apply equally to other galactomannans, as well.

The polymer fluids also include at least one removable polymer-which is removable from the emulsion downhole, and which removal then allows the remaining gelling polymer(s) and/or oligomer(s) to form the gel, creating a gel packer in place in the formation. Removable polymers may be removable by mechanisms such as precipitation, degradation, and the like. Such removal may be initiated by increased temperature, increased or decreased pH, contact with ions or salts or fluids in the reservoir, application of shear such as the fluid being pumped through a drill bit, and other initiators.

In one embodiment, the removable polymer is removed from the emulsion by exposing the polymer fluid to elevated temperatures which are above the lower critical solution temperature of the removable polymer, which causes precipitation of the polymer from the emulsion. The LCST (lower critical solution temperature) can be defined as the critical temperature at which the polymer solution undergoes phase separation from one phase (isotropic) to two phases (anisotropic) rich and poor in polymer. At temperatures below the LCST, the polymer is more hydrophilic and is dissolved due to H-bonding with water. Enthalpy is responsible for dissolution. At temperatures above the LCST, the polymer is more hydrophobic and phase separates. Entropy (hydrophobic interactions) is responsible for phase separation.

Useful removable polymers include cellulosic polymers such as methyl cellulose, hydroxypropyl cellulose, hydroxymethyl cellulose, carboxymethylcellulose and the like. Other useful removable polymers include the poly(N-substituted polyacrylamides). Useful poly(N-substituted polyacrylamides) include poly (N-isopropyl)acrylamide (poly(NIPAAm)) which exhibits shows an LCST=32° C., close to body temperature. When NIPAAm is copolymerised with a more hydrophilic monomer, e.g. acrylamide (AAm), the LCST increases. Conversely, when NIPAAm is copolymerised with a more hydrophobic monomer, e.g. N-tert-butylacrylamide (NtBAAm), the LCST decreases.

When incorporated, the polymers may be present at any suitable concentration. In various embodiments hereof, the total concentration of the gelling polymer(s) and removable polymer(s) in the fluid may be an amount of from about 0.1 pound to less than about 60 pounds per thousand gallons of fluid, or from about 1.5 to less than about 40 pounds per thousand gallons, from about 1.5 to about 35 pounds per thousand gallons, 1.5 to about 25 pounds per thousand gallons, or even from about 2 to about 10 pounds per thousand gallons.

Some fluid compositions useful in some embodiments of the invention may also include a gas component, produced from any suitable gas that forms an energized fluid or foam when introduced into an aqueous medium. See, for example, U.S. Pat. No. 3,937,283 (Blauer et al.) hereinafter incorporated by reference. Preferably, the gas component comprises a gas selected from the group consisting of nitrogen, air, argon, carbon dioxide, and any mixtures thereof. More preferably the gas component comprises nitrogen or carbon dioxide, in any quality readily available. The gas component may assist in the fracturing and acidizing operation, as well as the well clean-up process. The fluid may contain from about 10% to about 90% volume gas component based upon total fluid volume percent, preferably from about 20% to about 80% volume gas component based upon total fluid volume percent, and more preferably from about 30% to about 70% volume gas component based upon total fluid volume percent.

Breakers may optionally be used in some embodiments of the invention. The purpose of this component is to "break" or diminish the viscosity of the fluid so that this fluid is even more easily recovered from the formation after the need for zone isolation is past. Breakers such as oxidizers, enzymes, or acids may be used. Breakers reduce the polymer's molecular weight by the action of an acid, an oxidizer, an enzyme, or some combination of these on the polymer itself. In the case of borate-crosslinked gels, increasing the pH and therefore increasing the effective concentration of the active crosslinker (the borate anion), will allow the polymer to be crosslinked. Lowering the pH can just as easily eliminate the borate/polymer bonds. At pH values at or above 8, the borate ion exists and is available to crosslink and cause gelling. At lower pH, the borate is tied up by hydrogen and is not available for crosslinking, thus gelation caused by borate ion is reversible. Preferred breakers include 0.1 to 20 pounds per thousands gallons of conventional oxidizers such as ammonium persulfates, live or encapsulated, or potassium periodate, calcium peroxide, chlorites, and the like. In oil producing formations the film may be at least partially broken when contacted with formation fluids (oil), which may help destabilize the film.

The fluids may also include fillers. Useful fillers include fibers. Fibers used may be hydrophilic or hydrophobic in nature, but hydrophilic fibers are preferred. Fibers can be any fibrous material, such as, but not necessarily limited to, natural organic fibers, comminuted plant materials, synthetic polymer fibers (by non-limiting example polyester, polyaramide, polyamide, novoloid or a novoloid-type polymer), fibrillated synthetic organic fibers, ceramic fibers, inorganic fibers, metal fibers, metal filaments, carbon fibers, glass fibers, ceramic fibers, natural polymer fibers, and any mixtures thereof Particularly useful fibers are polyester fibers coated to be highly hydrophilic, such as, but not limited to, DACRON® polyethylene terephthalate (PET) Fibers available from Invista Corp. Wichita, Kans., USA, 67220. Other examples of useful fibers include, but are not limited to, polylactic acid polyester fibers, polyglycolic acid polyester fibers, polyvinyl alcohol fibers, and the like. When used in fluids of the invention, the fiber component may be included at concentrations from about 1 to about 15 grams per liter of the liquid phase of the fluid, preferably the concentration of fibers are from about 2 to about 12 grams per liter of liquid, and more preferably from about 2 to about 10 grams per liter of liquid.

Embodiments of the invention may also include particles that are substantially insoluble in the fluids, and which may be useful in the zone after isolation has been removed, e.g., when the zone is a fracture in the formation. Particulate material carried by the treatment fluid and held in the gel may remain in a gel-isolated fracture after the gel has been broken and cleaned up, thus propping open the fracture when the fracturing pressure is released and the well is put into production. Suitable particulate materials include, but are not limited to, sand, walnut shells, sintered bauxite, glass beads, ceramic materials, naturally occurring materials, or similar materials. Mixtures of proppants can be used as well. If sand is used, it will typically be from about 20 to about 100 U.S. Standard Mesh in size. Naturally occurring materials may be underived and/or unprocessed naturally occurring materials, as well as materials based on naturally occurring materials that have been processed and/or derived. Suitable examples of naturally occurring particulate materials for use as proppants include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc. including such woods that have been processed by grinding, chipping, or other form of particalization, processing, etc. Further information on nuts and composition thereof may be found in Encyclopedia of Chemical Technology, Edited by Raymond E. Kirk and Donald F. Othmer, Third Edition, John Wiley & Sons, Volume 16, pages 248-273 (entitled "Nuts"), Copyright 1981, which is incorporated herein by reference. Other useful fillers include particles of Portland cement, and the like.

Embodiments of the invention may use other additives and chemicals that are known to be commonly used in oilfield applications by those skilled in the art. These include, but are not necessarily limited to, materials in addition to those mentioned hereinabove, such as breaker aids, oxygen scavengers, alcohols, scale inhibitors, corrosion inhibitors, fluid-loss additives, bactericides, iron control agents, organic solvents, and the like. Also, they may include a co-surfactant to optimize viscosity or to minimize the formation of stabilized emulsions that contain components of crude oil, or as described hereinabove, a polysaccharide or chemically modified polysaccharide, natural polymers and derivatives of natural polymers, such as cellulose, derivatized cellulose, guar gum, derivatized guar gum, or biopolymers such as xanthan, diutan, and scleroglucan, synthetic polymers such as polyacrylamides and polyacrylamide copolymers, oxidizers such as persulfates, peroxides, bromates, chlorates, chlorites, periodates, and the like. Some examples of organic solvents include ethylene glycol monobutyl ether, isopropyl alcohol, methanol, glycerol, ethylene glycol, mineral oil, mineral oil without substantial aromatic content, and the like.

The concentration of proppant in the polymer fluid can be any concentration known in the art, and will preferably be in the range of from about 0.05 to about 3 kilograms of proppant added per liter of liquid phase. Also, any of the proppant particles can further be coated with a resin to potentially improve the strength, clustering ability, and flow back properties of the proppant.

The procedural techniques for pumping fluids down a wellbore to fracture a subterranean formation are well known. The person that designs such treatments is the person of ordinary skill to whom this disclosure is directed. That person has available many useful tools to help design and implement the treatments, including computer programs for simulation of treatments.

The following examples are presented to illustrate the preparation and properties of energized aqueous fluids comprising heteropolysaccharides and a surfactant, and should not be construed to limit the scope of the invention, unless otherwise expressly indicated in the appended claims. All percentages, concentrations, ratios, parts, etc. are by weight unless otherwise noted or apparent from the context of their use.

EXAMPLES

Example 1

Thermal Activation of a Two-Phase Polymer Solution to become an Elastic Gel

Experimentally, it has been found that solutions of guar and hydroxypropyl cellulose (HPC) form aqueous phase-separated solutions over a range of polymer concentrations. A phase-separated mixture was formed by simultaneously dissolving 2 wt % dry guar and 2 wt % dry HPC in 100 ml of DI water in a stirred Waring blender. After stirring for approximately an hour, the sample was allowed to rest for an hour to confirm phase separation. The phase-separated solution was then gently stirred by hand to remix the guar-rich and HPC-rich phases.

Figure 1:
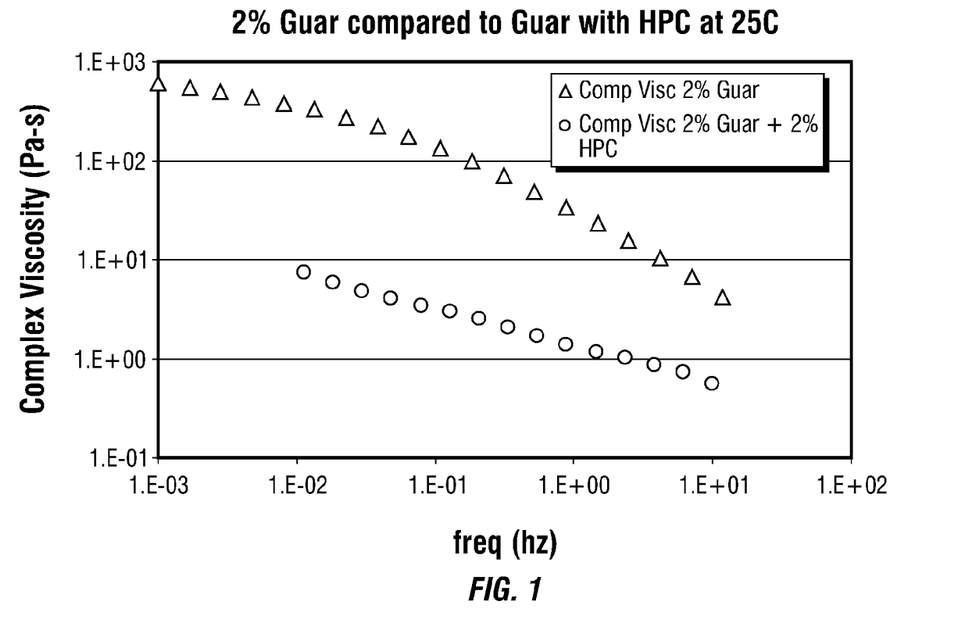
FIG. 1 is a graph of complex viscosity versus frequency for 2% guar gel and a fluid containing 2% guar and hydroxypropyl guar (HPC) as a removable polymer at 25° C.

The rheology of this mixed two-phase polymer mixture was then measured at 25 C as shown in FIG. 1. The fluid is of sufficiently low viscosity to be easily pourable and pumpable. It is substantially less viscous than the 2% guar solution viscosity shown for comparison in FIG. 1. FIG. 1 illustrates how the presence of the HPC polymer phase dramatically reduces the rheology of the guar polymer. By itself, the 2% guar polymer rheology would be too viscous to pump. The addition of 2% HPC to this polymer in solution, however, reduces the complex viscosity by more than an order of magnitude at low frequencies (i.e., low shear rates).

FIG. 1 shows the rheology of 2% Guar compared to a two-phase solution of 2% Guar with 2% HPC (100000). The addition of HPC polymer phase separates the guar solution and reduces the solution rheology by more than an order of magnitude at lower frequencies.

Figure 2:
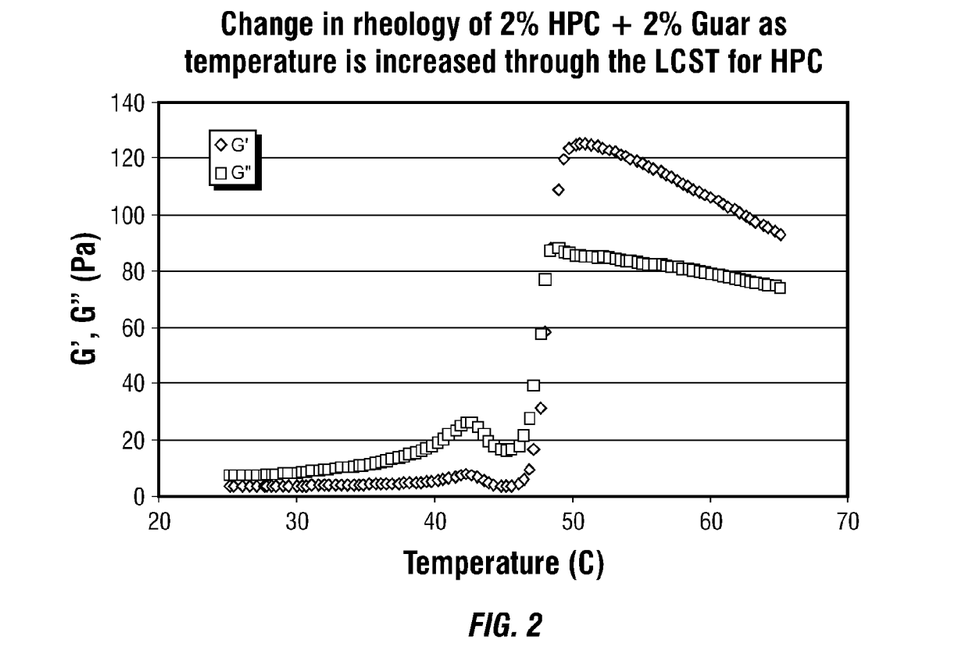
FIG. 2 is a graph of storage modulus (G') and viscous modulus (G") versus temperature a fluid containing 2% guar and HPC as a removable polymer.

FIG. 2 shows the viscous and elastic moduli (measured at 0.5 Hz with a 10% strain) of the two-phase polymer solution as the temperature of the sample is increased from 25 C to 65 C in the cup of a Bohlin rheometer (CVOR-200) with small-amplitude oscillation (10% linear strain). The LCST for the HPC is known from lab testing and published literature to be approximately 45 C. It is observed in FIG. 2 that the elastic modulus of the two-phase solution climbs dramatically (by approximately two orders of magnitude) as the fluid is heated through this critical temperature. The sample was also visually observed to transform from a translucent liquid to an opaque white gel as the temperature increased from 45 C to approximately 50 C.

Figure 3:
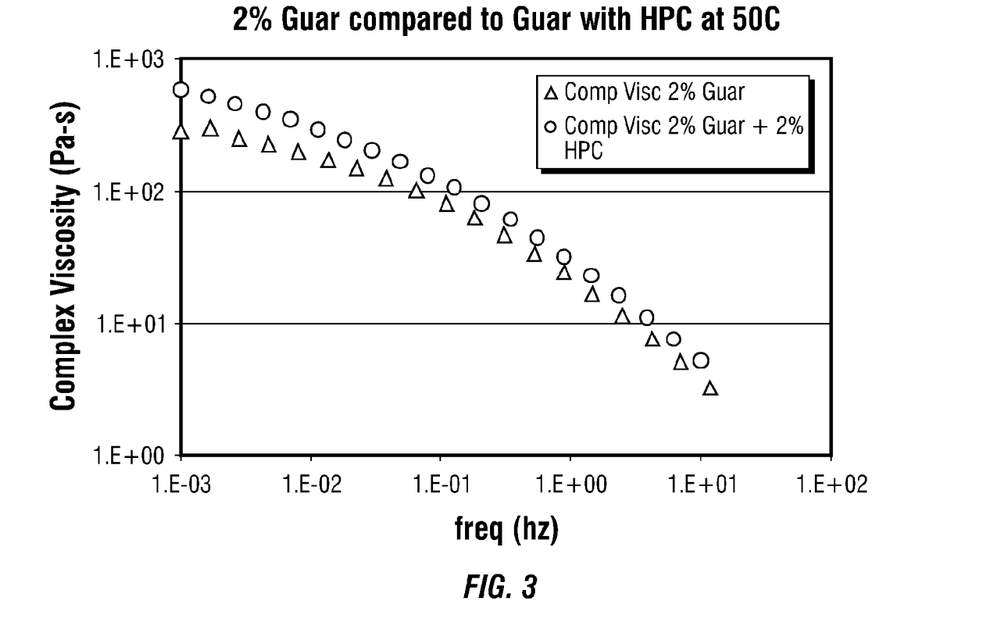
FIG. 3 graph of complex viscosity versus frequency for 2% guar gel and a fluid containing 2% guar and HPC as a removable polymer at 50° C.

Once the sample was heated above the critical temperature, its rheology was again measured (as shown in FIG. 3 at 50 C), and compared to the rheology of a 2% guar solution at this same temperature. With the HPC now precipitated out of solution at the elevated temperature, the fluid rheology now closely matches that of the guar alone in solution. In other words, the temperature trigger has removed the HPC phase from the solution, and thereby increased the overall rheology of the polymer solution.

Example 2

Thermal Activation of a Gel

As a second example of thermal activation of a gel, guar was combined with HPC having a molecular weight of approximately 10,000 to make a low viscosity, pumpable mixture. This example was similar to the first example except that the HPC used had a molecular weight which was less by an order of magnitude. The phase diagram for this polymer combination is shown in FIG. 4.

Figure 4:
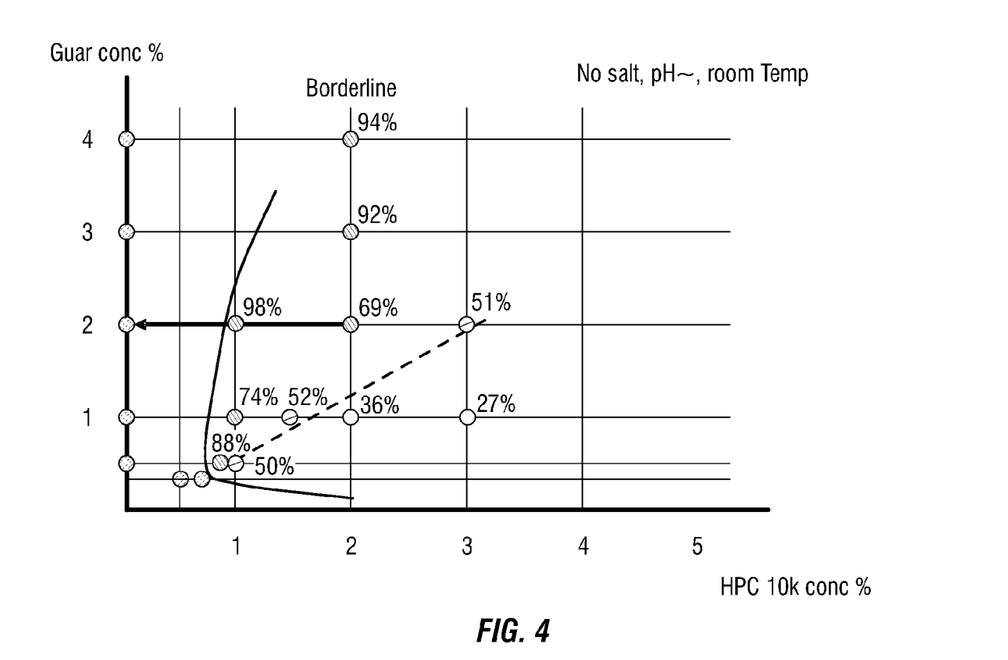
FIG. 4 is a phase diagram for a two-phase fluid.
Figure 5:
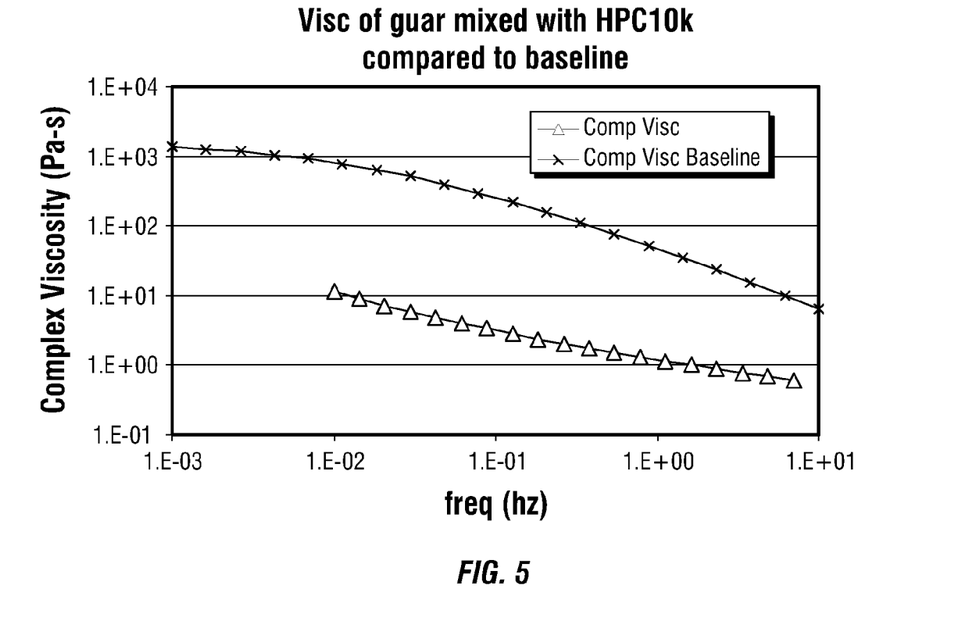
FIG. 5 is a graph of complex viscosity versus frequency for 2% guar gel and a fluid containing 2% guar and a low molecular weight HPC as a removable polymer at 25° C.

In FIG. 4, the red line in the phase diagram approximates the binodal for the system. Compositions to the right of the binodal are two phase fluids that will phase separate with time. Because of the phase separation, these fluids are low viscosity formulations that can easily be poured or pumped. Approximately 31% of the fluid volume is filled with a HPC-rich phase that prevent the full guar viscosity from developing. FIG. 5 provides measurements of the guar/HPC mixture at this condition and a comparison with 2% guar alone in water at this temperature. The addition of HPC 10,000 decreases the viscosity of the guar by approximately two-orders of magnitude, resulting in a pumpable fluid.

Example 3

Salt Activation of a Two-Phase Polymer Solution to become an Elastic Gel

Figure 6:
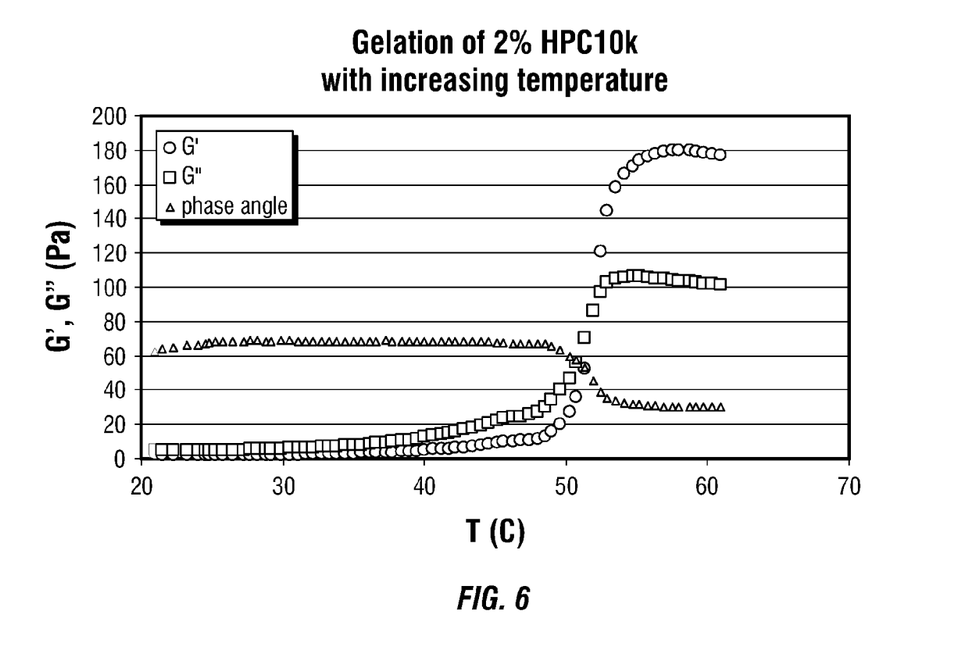
FIG. 6 is a graph of storage modulus (G') and viscous modulus (G") versus temperature for a fluid containing 2% guar and a low molecular weight HPC as a removable polymer at 25° C.

A settable fluid was formed, that can set into a gel either by addition of salt or by exposure to increased temperature. Formulation was 2% guar and 2% Methocel®. The salt used in the example was NaCl. FIG. 6 shows the rheology of 2% guar in aqueous solution with 2% HPC10,000. For comparison, the rheology of 2% guar in solution is also shown.

FIG. 6 shows the effect on the mixture rheology as the temperature is increased from 21 C to 60 C over a 30 minute time period. The rheology has been quantified in FIG. 6 by monitoring the elastic and viscous moduli continuously with a 10% strain oscillation at a frequency of 0.5 Hz. At lower temperatures, the solution behaves as a low viscosity fluid with the viscous modulus being greater than the elastic modulus. As the temperature exceeds the LCST for the HPC10000, the solution changes to behave like an elastic solid with the elastic modulus increasing by nearly two orders of magnitude above its low temperature value. As the viscosity increases, the sample is visibly observed to become a cloudy white, elastic gel.

Figure 7:
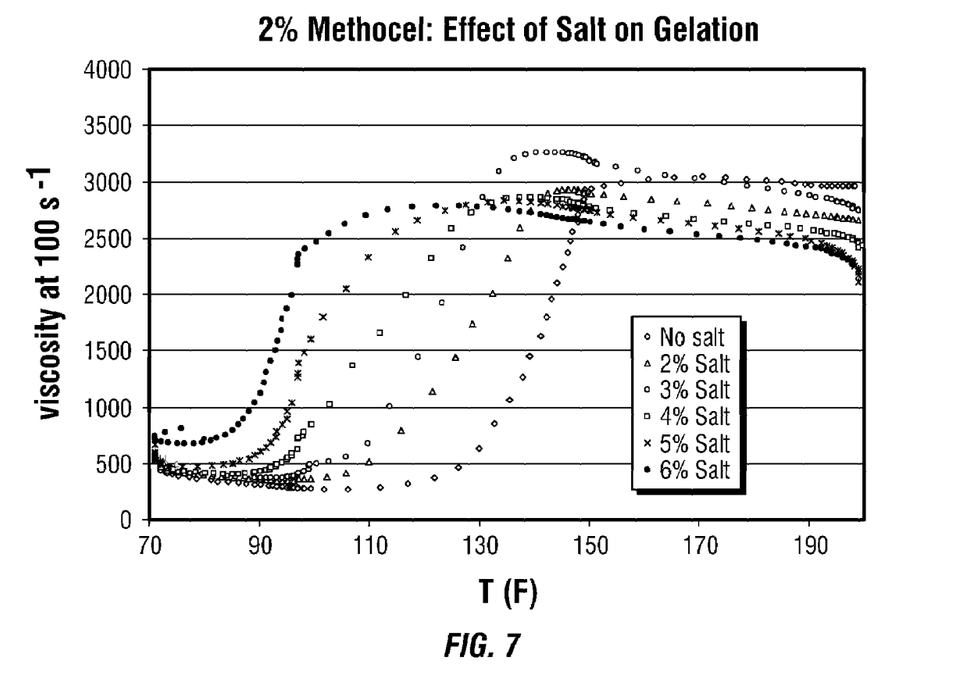
FIG. 7 is a graph of viscosity versus temperature for a polymeric fluid with increased concentration of added salt.

FIG. 7 shows the modulus increases as the level of salt (NaCl) contacted by the polymer fluid causes a gel to form from the polymer fluid.

Example 4

A pH-Trigger for Moving a System from Two-Phase to Single-Phase to Make a Viscous Gel It has been found in lab measurements that a uniformly charged polymer in DI water does not readily phase separate. Presumably this is because the charges on the polymer chain hinder the chain from coiling up in water to separate away from the second species. Phase separation with charged polymers can be achieved, however, by neutralizing these charges to make the polymer act like a neutral species. This has been successfully done with salt addition to cationic guar, for example.

Figure 8:
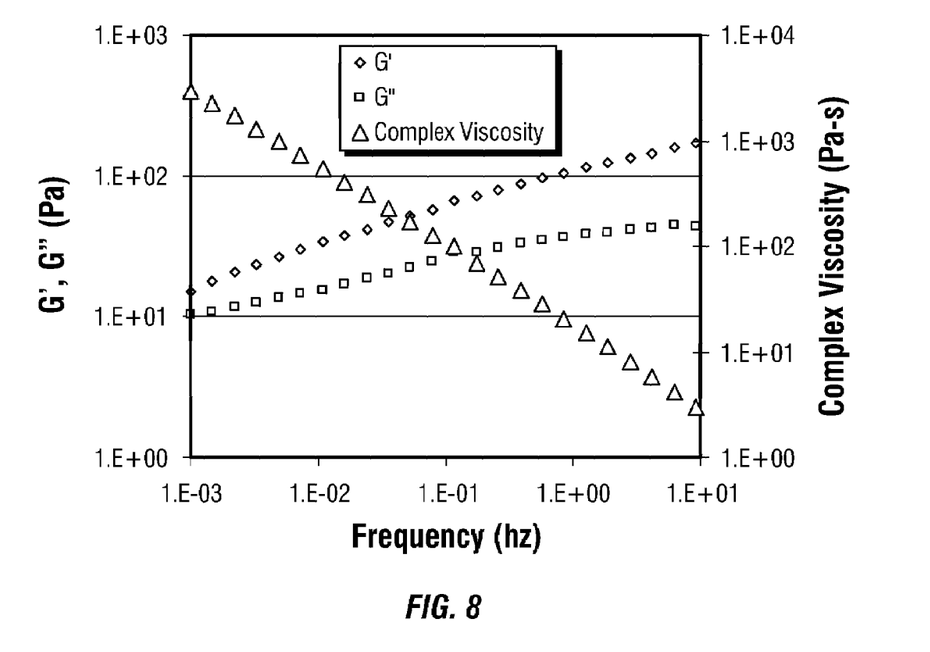
FIG. 8 is a graph of storage modulus (G') and viscous modulus (G") versus frequency showing a two phase system becoming single phase with a concomitant change in viscosity when the pH is raised above 3.

Being anionic for "normal" conditions, carboxymethyl hydroxypropyl guar (CMHPG,) does not readily phase separate in DI water, even with the addition of PEG 8000 at concentrations that would phase separate non-derivatized guar. It has been discovered, though, that this polymer can be phase separated with PEG if the pH of the solution is reduced to pH less than about 3. At this pH range, the COO— groups on the polymer are protonated to become COOH groups, thereby eliminating the anionic nature of the polymer and allowing it to phase separate. When the pH of the phase-separated system is raised to a pH of above 3, however, the process is reversed and the two phase system becomes single phase with a concomitant change in viscosity. This is illustrated in FIG. 8 for a 2% phase separated system of CMHPG phase separated with 4% PEG 8000 at a pH of approximately 2.7. At this low pH condition the phase separated system is water-like in viscosity, even though it has 2% guar polymer. Upon adding potassium hydroxide to bring the pH up to 3.3, however, the system rapidly becomes single phase and very viscous. The system was then brought up to a pH of approximately 10 by addition of more KOH, and the rheology of the 2% CMHPG fluid was then measured at 21 C. The rheology measurement (shown in FIG. 8) shows a highly viscous gel triggered by the change in pH.

CMHPG alone, is, in fact, soluble and viscous in aqueous solution at a pH of 2.7. The low viscosity condition achieved in this example is a result of a phase separation that was verified by centrifuging the sample. The phase-separated sample after centrifugation was approximately 40% "guar rich" phase and 60% "PEG rich" phase.

FIG. 8 shows the rheology of the viscous gel created by pH-triggering of the settable, two phase fluid created from 2% CMHPG and 4% PEG 8000.

Table 1 below lists some useful removable polymers and their LCST values.

TABLE 1

| Polymer or Co-polymer | Solvent | LCST (° C.) |
|---|---|---|
| Poly(N-isopropylacrylamide) (poly(NIPAAm)) | water | 32 |
| Poly(82% NIPAAm:18% AAm) | water | 45 |
| Poly(60% NIPAAm:40% N-tert-butylAAm) | water | 10 |
| Poly(N,N'-diethylAAm) | water | 26-35 |
| Poly(dimethylaminoethylmethacrylate) | water | 50 |
| Poly(N-(L)-(hydroxymethyl)propylmethacrylamide) | water | 30 |
| Poly(vinyl methyl ether) | water | 40 |
| Poly(ethylene glycol) | water | 120 |
| Poly(propylene glycol) | water | 50 |
| Poly(methacrylic acid) | water | 75 |
| Poly(vinyl alcohol) | water | 125 |
| Poly(vinyl methyl oxazolidone) | water | 65 |
| Poly(vinyl pyrrolidone) | water | 160 |
| Poly(silamine) | water | 37 |
| Methylcellulose | water | 80 |
| Hydroxypropylcellulose | water | 45 |
| Polyphosphazene derivatives | water | 33-100 |
| Poly(N-vinylcaprolactam) | water | 30 |
| Poly(siloxyethylene glycol) | water | 10-60 |

The particular embodiments disclosed above are illustrative only, as the invention may be modified and practiced in different but equivalent manners apparent to those skilled in the art having the benefit of the teachings herein. Furthermore, no limitations are intended to the details herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of isolating at least one zone of a subterranean formation penetrated by a wellbore, the method comprising:
   a. preparing a water-in-water emulsion comprising a plurality of polymers or oligomers including at least one removable polymer or oligomer;
   b. combining the water-in-water emulsion with an aqueous medium to prepare a low viscosity polymer fluid;
   c. introducing the fluid into a zone in the formation,
   d. removing the at least one removable polymer or oligomer, allowing a remaining polymer or polymers to form a gel, isolating said zone from at least one other zone in the formation.

2. The method of claim 1 wherein the polymer fluid has a viscosity of no more than about 1000 cP at about 25° C.

3. The method of claim 1 wherein said at least one polymer or oligomer is removed from the fluid by precipitation or degradation of said at least one removable polymer or oligomer.

4. The method of claim 3 wherein said degradation or precipitation is caused by elevation of temperature above a lowest critical solution temperature of the at least one removable polymer or oligomer.

5. The method of claim 4 wherein the lowest common solution temperature is at least about 45° C.

6. The method of claim 3 wherein said degradation or precipitation is caused by contact with reservoir fluids.

7. The method of claim 3 wherein said degradation or precipitation is caused by a change in pH.

8. The method of claim 3 wherein said degradation or precipitation is caused by shearing said fluid through a drill bit.

9. The method of claim 3 wherein said degradation or precipitation is caused by contact with an ion or salt.

10. The method of claim 1 wherein at least one of said plurality of oligomers or polymers is selected from the group consisting of guar, guar derivative, cellulose, cellulose derivative, or diutan.

11. The method of claim 1 wherein the removable polymer or oligomer is selected from the group consisting of poly(N-isopropylacrylamide, poly(N,N'-diethylacrylamide), poly (dimethylaminoethylmethacrylate), poly(N-(L)-(hydroxymethyl)propylmethacrylamide), poly(vinyl methyl ether), poly (ethylene glycol), poly (propylene glycol), poly(methacrylic acid), poly(vinyl alcohol), poly(vinyl methyl oxazolidone), poly(vinyl pyrrolidone), and poly(vinyl pyrrolidone).

12. A low viscosity wellbore polymer fluid gelling system comprising
   an aqueous medium and
   a water-in-water emulsion comprising a plurality of polymers or oligomers, including at least one removable polymer or oligomer, and
   at least one gelling polymer or oligomer,
   wherein said gelling polymer forms a gel having a storage modulus of at least about 60 Pa after said removable polymer is removed from the fluid.

13. The fluid of claim 12 wherein the polymer fluid has a viscosity of no more than about 1000 cP at 25° C.

14. The fluid of claim 12 wherein the gelling polymer comprises polyethylene glycol and one or more of guar, guar derivative, cellulose, cellulose derivative, or diutan.

15. The fluid of claim 12 wherein at least one of the plurality of oligomers or polymers is selected from the group consisting of poly(N-isopropylacrylamide, poly(N,N'-diethylacrylamide), poly(dimethylaminoethylmethacrylate), poly(N-(L)-(hydroxymethyl)propylmethacrylamide), poly (vinyl methyl ether), poly(ethylene glycol), poly(propylene glycol), poly(methacrylic acid), poly(vinyl alcohol), poly(vinyl methyl oxazolidone), poly(vinyl pyrrolidone), and poly (vinyl pyrrolidone).

16. An isolated zone in a wellbore in a subterranean formation, said zone being isolated from at least one other zone by means of a gel packer, said gel packer comprising a gelled polymer, said polymer having been pumped into said wellbore as a low viscosity polymer fluid comprising a plurality of polymers or oligomers, including one removable polymer or oligomer, and one gelling polymer or oligomer, wherein said fluid has a viscosity of no more than about 1000 cP at 25° C., and wherein said gel packer has a storage modulus of at least about 60 Pa after said removable polymer is removed from the fluid.

17. A method of isolating at least one zone of a subterranean formation penetrated by a wellbore, the method comprising:
   a. preparing a water-in-water emulsion comprising a plurality of polymers or oligomers;
   b. combining the water-in-water emulsion with an aqueous medium to prepare a low viscosity polymer fluid;
   c. introducing the fluid into a zone in the formation,
   d. contacting the fluid with a reactant to form a gel, isolating said zone from at least one other zone in the formation, wherein said reactant is selected from an ingredient in a reservoir fluid and a salt present in the formation.

18. The method of claim 17 wherein the polymer fluid has an initial viscosity of no more than about 1000 cP at about 25° C.

19. The method of claim 17 wherein at least one of said plurality of oligomers or polymers is selected from the group consisting of polyethylene glycol guar, guar derivative, cellulose, cellulose derivative, or diutan.

20. The method of claim 17 wherein at least one of the plurality of oligomers or polymers is selected from the group consisting of poly(N-isopropylacrylamide, poly(N,N'-diethylacrylamide), poly(dimethylaminoethylmethacrylate), poly(N-(L)-(hydroxymethyl)propylmethacrylamide), poly (vinyl methyl ether), poly(ethylene glycol), poly (propylene glycol), poly(methacrylic acid), poly(vinyl alcohol), poly(vinyl methyl oxazolidone), poly(vinyl pyrrolidone), and poly (vinyl pyrrolidone).

21. The method of claim 17 wherein said reactant forms a gel when temperature is elevated above a lowest critical solution temperature of one of said plurality of polymers or oligomers.

22. The method of claim 17 wherein the lowest common solution temperature is at least about 45° C.

23. The method of claim 17 wherein said degradation or precipitation is caused by contact with reservoir fluids.

24. The method of claim 17 wherein the gelation is caused by a change in pH.

* * * * *